(12) United States Patent
Wada et al.

(10) Patent No.: US 6,199,672 B1
(45) Date of Patent: Mar. 13, 2001

(54) DUST COVER MOUNTING STRUCTURE

(75) Inventors: Kazuo Wada; Masahiro Hirano, both of Shizuoka (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/129,336

(22) Filed: Aug. 5, 1998

(30) Foreign Application Priority Data

Aug. 5, 1997 (JP) .................................................. 9-222089

(51) Int. Cl.[7] .......................................................... F16F 9/38
(52) U.S. Cl. ...................................................... 188/322.12
(58) Field of Search ........................ 188/322.19, 322.12; 267/64.26; 380/276

(56) References Cited

U.S. PATENT DOCUMENTS 2,163,255 * 6/1939 Binder et al. .................. 188/322.12

FOREIGN PATENT DOCUMENTS

| | | | |
|---|---|---|---|
| 2417190 | * 10/1975 | (DE) | ................................. 267/64.26 |
| 845556 | * 8/1939 | (FR) | ................................. 267/64.26 |
| 2186050 | * 8/1987 | (GB) | ................................. 267/64.26 |
| 2205382 | * 12/1988 | (GB) | ............................... 188/322.19 |
| 2276930 | * 10/1994 | (GB) | ............................... 188/322.12 |

* cited by examiner

Primary Examiner—Matthew C. Graham
Assistant Examiner—Melanie Talavera
(74) Attorney, Agent, or Firm—Orum & Roth

(57) ABSTRACT

A structure wherein a dust cover (60) is mounted in a lower portion of an under bracket (14) for mounting an inner tube (13) of a front fork (11) to a vehicle body side; an annular stopper (61) is fixed on an outer peripheral surface of the inner tube, and a flange (64) of the dust cover is locked through an annular cover seat (62) by the stopper; the dust cover is structured such that the flange thereof is held and fixed between the under bracket inserted to the inner tube and the stopper under a compressing deformation in an axial direction of the cover seat, and the inner peripheral surface of the dust cover is elastically brought into contact with the outer peripheral surface of the cover seat so as to be supported to the inner tube in a concentric state.

8 Claims, 13 Drawing Sheets

DUST COVER MOUNTING STRUCTURE

BACKGROUND OF THE INVENTION

1. Field of the Invention

The present invention relates to a dust cover mounting structure for the front fork of a two-wheel vehicle or the like and for a shock absorber used for such vehicle.

2. Description of the Related Art

In the prior art as shown in FIG. 14 of the attached drawings, a front fork assembly 100 for a motorcycle holds a pair of front forks 102 at both ends of under bracket 101, and an upper bracket (not shown), axially supports a front wheel in a freely rotating manner on front forks 102 and pivotally supports a steering shaft 103 arranged at a center portion of the under bracket 101 and the upper bracket to a head pipe (not shown) of the vehicle body frame, thereby steering the front wheel.

The front fork 102 is structured so that a vehicle body inner tube 104 is slidably inserted into a wheel side outer tube 105, so that the inner tube 104 is held to the outer bracket 101 and the upper bracket. The inner tube 104 is structured so that an outer peripheral surface thereof is protected by an upper dust cover 106 and an under dust cover 107.

The upper dust cover 106 is supported by a supporting member 109 made of a synthetic resin on an upper surface of the under bracket 101 through a washer 108. The under dust cover 107 has a flange 111 attached to an upper opening of a cylindrical cover main body 110, as shown in FIGS. 14 to 16. The under dust cover 107 has a mounting bolt 114 inserted into a hole 112 of the flange 111 and hole 113 of the under bracket 101 and is secured to the under bracket 101 by means of a nut 115.

However, in the prior art described above, since the under dust cover 107 is fixed to the under bracket 101 by using a plurality of, for example, three mounting bolts 114, it is necessary to form the bolt holes 113 and 112 in the under bracket 101 and the flange 111 of the under dust cover 107. This makes the shape of the under bracket 101 and the under dust cover 107 intricate and hard to use. The assembly operation of the under dust cover 107 is therefore difficult.

Further, since the under dust cover 107 is attached to the under bracket 101 by a plurality of mounting bolts 114, the load of the under dust cover 107 is shifted to the mounting bolt 114 having the greatest fastening torque, so that concentricity is difficult to obtain with respect to the inner tube 104. Accordingly, a slant phenomenon occurs where the axis of the under dust cover 107 and an axis of the inner tube 104 are inclined so that the under dust cover 107 is slanted in a direction of arrow A in FIG. 14. The under dust cover 107 is brought into contact with the outer peripheral surface of the outer tube 105, creating risk of rubbing the outer peripheral surface and causing wear and damage.

SUMMARY OF THE INVENTION

The present invention takes the matter mentioned above into consideration, and an object of the present invention is to provide a simple dust cover mounting structure, and prevents a slant phenomenon of the dust cover.

In accordance with the present invention, there is provided a dust cover mounting structure for a front fork, structured so that a vehicle body side tube and a wheel side tube are slidably inserted so as to constitute a front fork, a dust cover for protecting an outer peripheral surface of the vehicle body side tube mounted to a lower portion of a bracket for mounting the vehicle body side tube to a vehicle body, and wherein an annular supporting member is fixed to the outer peripheral surface of the vehicle body side tube, a flange portion of the dust cover is locked to the supporting member through an annular elastic body. The dust cover is structured such that the flange portion is held and fixed between the bracket inserted to the vehicle body side tube and the supporting member under an axial compressing deformation of the elastic body. An inner peripheral surface is elastically brought into contact with an outer peripheral surface of the elastic body is attached to the vehicle body side tube in a concentric state.

Further, in accordance with the present invention, there is provided a dust cover mounting structure for a shock absorber, structured so that a piston rod is inserted into a cylinder to constitute a shock absorber. A dust cover for protecting an outer peripheral surface of the piston rod is mounted on the outer peripheral surface of the piston rod, wherein an annular supporting member is mounted to an outer peripheral surface of an end portion opposite to the cylinder side of the piston rod. A flange portion of the dust cover is locked to the supporting member through an annular elastic body, and the dust cover is held and fixed between a pressing member inserted into the piston rod and the supporting member under axial compressing deformation of the elastic body. An inner peripheral surface is elastically brought into contact with an outer peripheral surface of the elastic body and concentrically attached to the piston rod.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENTS

[A] First Embodiment

Figure 1:
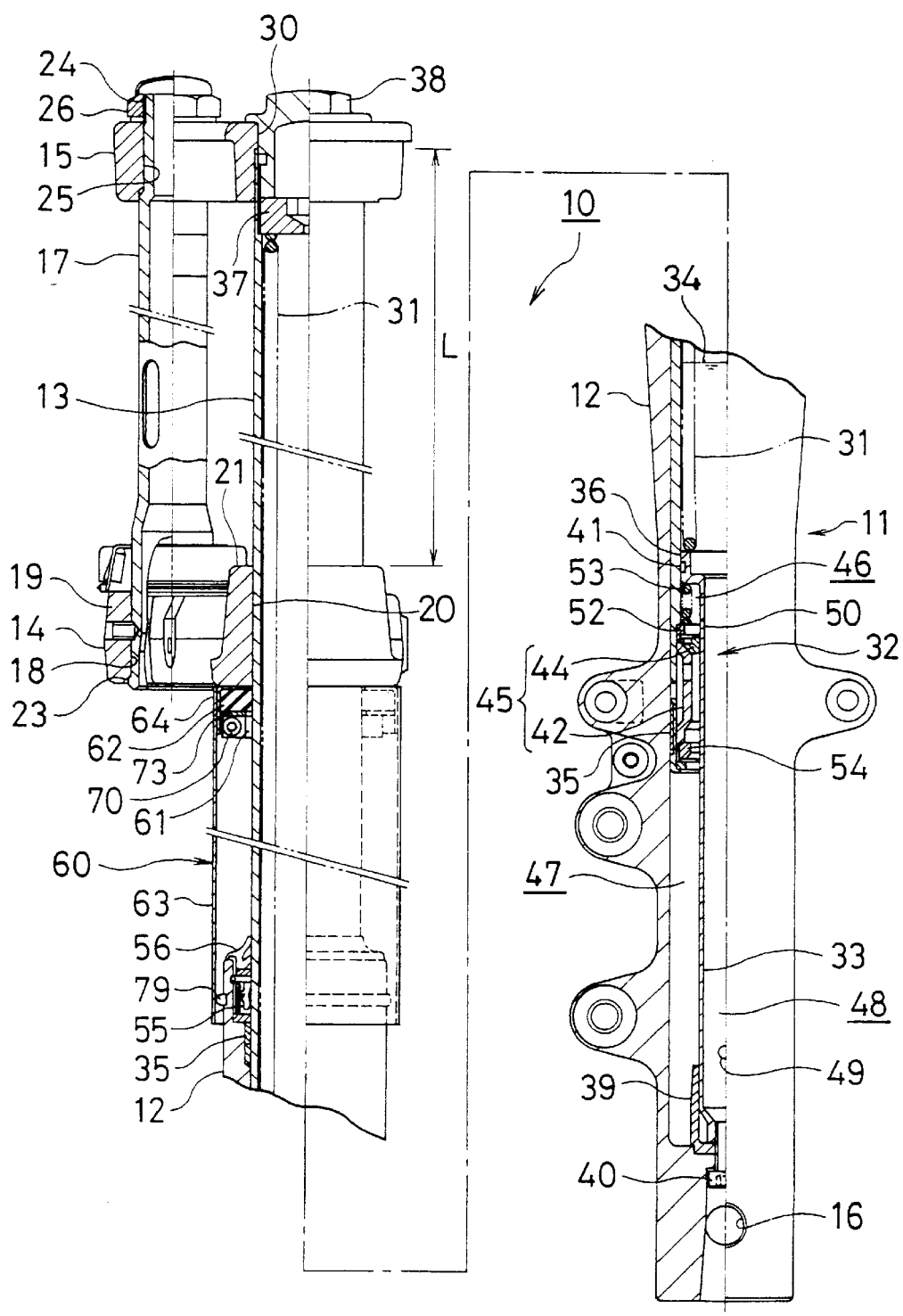
FIG. 1 is a side elevational view showing a front fork assembly to which a first embodiment of a dust cover mounting structure in accordance with the present invention is applied, in a partially sectional manner.

A normal-standing type front fork assembly 10 for a motorcycle as shown in FIG. 1 has an inner tube 13 of front forks 11 at both ends of each of an under bracket 14 and an upper bracket 15, and rotatably supports a front wheel (not shown) by a bearing portion 16 of an outer tube 12 of the front fork 11. It pivotally supports a steering shaft 17 arranged at a center portion of each of the under bracket 14 and the upper bracket 15 to a head pipe of a vehicle body frame (both not shown), to steer the front wheel.

The front fork 11 is structured to be capable of expansion and contraction by a structure that has an inner tube 13 as a vehicle body side tube that is slidably fitted into an outer tube 12 as a wheel side tube, thereby forming a suspension spring 31 and a damper apparatus 32 described later.

The under bracket 14 is a member for supporting a bending load, a torsion torque and the like from the front wheel through the front fork, and is structured to have a high strength and a high rigidity. The under bracket 14 has a center boss 19 forming a center hole 18 and a pair of right and left fork bosses 21 forming fork holes 20. Both sides of the center hole 18 are connected to each other by a bridge portion 22, as shown in FIG. 2.

The steering shaft 17 is formed in a cylindrical shape, as shown in FIG. 1. A stopper portion 23 is expanded at a base end portion and a male screw portion 24 is cut at a front end portion. The steering shaft 17 has a front end portion inserted into the center hole 18 from a back surface side of the under bracket 14, and the base end portion 23 is press fitted to the center hole 18, so that the portion 23 prevents the steering shaft 17 from moving out to the lower portion in FIG. 1. Further, the front end portion of the steering shaft 17 is inserted into a center hole 25 of the upper bracket 15, and a nut 26 engages the male screw 24, so that the steering shaft 17 is secured in the under bracket 14 and the upper bracket 15.

Figure 2:
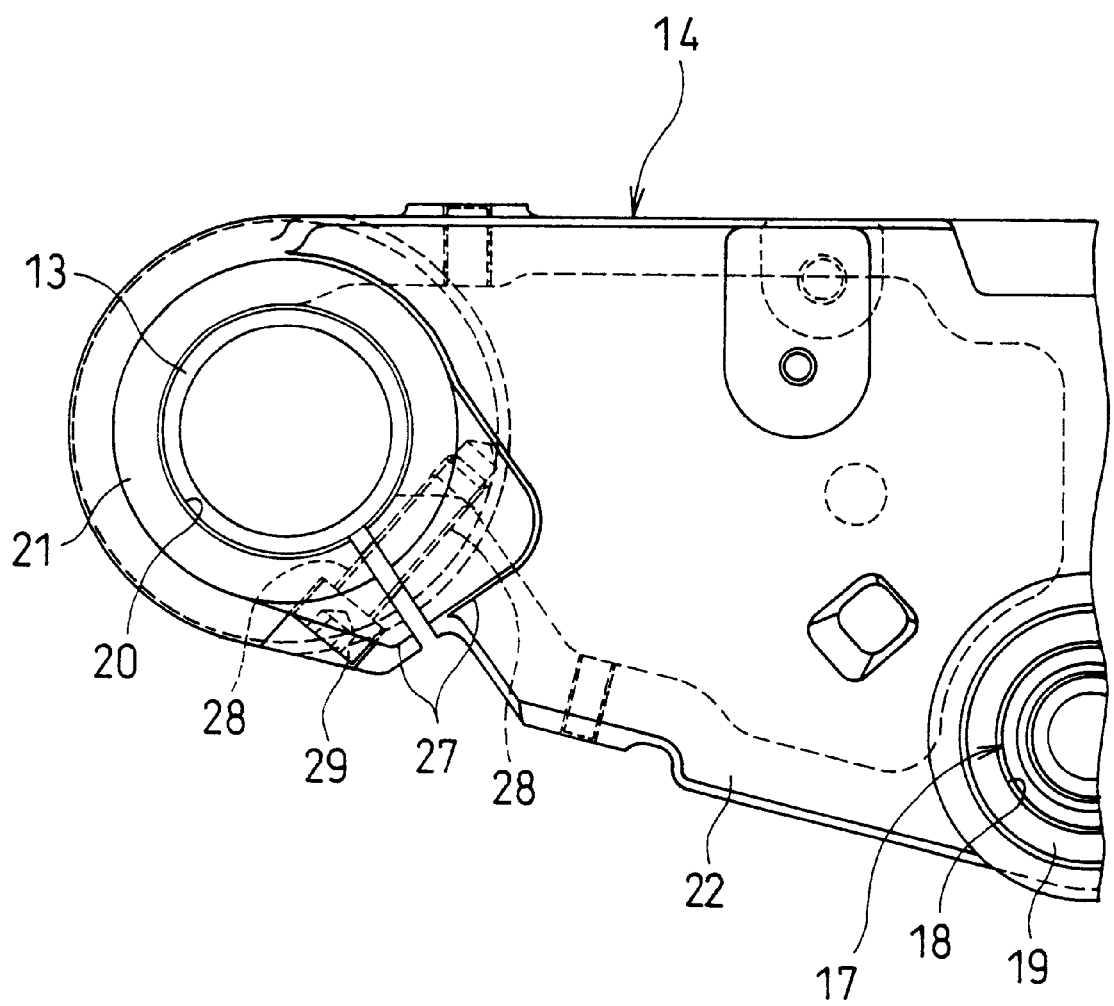
FIG. 2 is a plan view which shows a left half portion of the under bracket shown in FIG. 1.

As shown in FIG. 2, in a pair of right and left fork bosses 21 in the under bracket 14, a cramp portion 27 is formed at both end portions of the under bracket 14 and a female screw portion 28 is formed on the cramp portion 27. The diameter of the fork hole 20 is reduced by inserting the inner tube 13 of the front fork 11 into the fork hole 20 and connecting the fastening bolt 29 with the screw portion 28. The inner tube 13 is held between the fork bosses 21. The inner tube 13 is also inserted to the fork hole 30 in the upper bracket 15 and is held between the upper brackets 15 by a fastening bolt (not shown).

The front fork 11 shown in FIG. 1 is structured so that oil 34 is charged within the outer tube 12 and the inner tube 13 as well as the inner tube 13 which is slidably arranged within the outer tube 12. The suspension spring 31 is interposed between a hollow pipe 33 provided in the outer tube 12 and the inner tube 13.

A guide bush 35 is attached to each of an inner periphery of an upper end portion of the outer tube 12 and an outer periphery of a lower end portion of the inner tube 13. The outer tube 12 and the inner tube 13 are structured to be slidable through the guide bushes 35.

A lower end of the suspension spring 31 is brought into contact with a diameter expanding portion 36 (mentioned below) of the hollow pipe 33 and is supported on the outer tube 12. Further, an upper end of the suspension spring 31 is supported on the inner tube 13 through a spring sheet 37 by a fork bolt 38 engaging the inner periphery of the upper end of the inner tube 13. An impact from a road surface is absorbed by the suspension spring 31.

Figure 3:
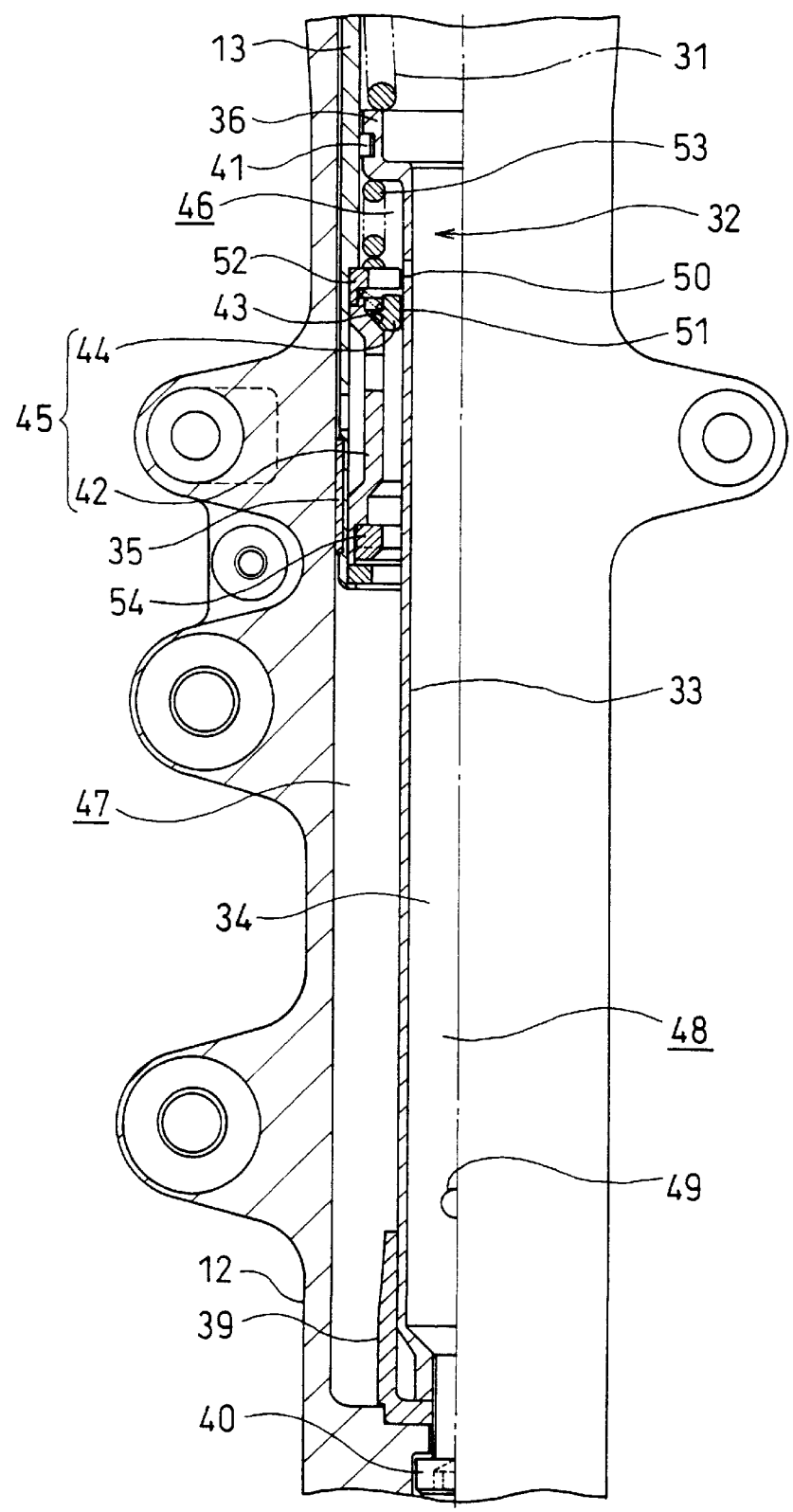
FIG. 3 is a half cross sectional view which shows a lower portion of FIG. 1 in an enlarged manner.

Further, the damper apparatus 32 mentioned above is structured in the following manner. That is, as shown in FIG. 3, the lower end portion of the hollow pipe 33 is attached to the outer tube 12 by the mounting bolt 40 through an oil lock piece 39 described below. In this state, the hollow pipe 33 is completely received within the outer tube 12 and is arranged in such a manner as to be capable of being received in the inner tube 13. The diameter expanding portion 36 is formed at the front end of the hollow pipe 33, and an outer periphery of the diameter expanding portion 36 is structured to freely slide on the inner peripheral surface of the inner tube 13 through a piston ring 41.

Further, an oil lock collar 42 is adhered to an inner periphery of a lower end (a front end) of the inner tube 13, and a check valve 44 is arranged between an inclined surface portion 43 of the oil lock collar 42 and the hollow pipe 33. The check valve 44 is urged by a spring to the inclined surface portion 43 of the oil lock collar 42. A piston 45 is formed by the oil lock collar 42 and the check valve 44. Accordingly, within the front fork 11, a piston upper chamber 46 is defined by the outer peripheral surface of the hollow pipe 33, the outer tube 12 and the inner peripheral surface of the inner tube 13 by being surrounded by the diameter expanding portion 36 of the hollow pipe 33 and the piston 45, and a piston lower chamber 47 defined in the lower portion of the piston 45, respectively.

Further, the inner portion of the hollow pipe 33 has a reservoir chamber 48 as an oil chamber within the hollow pipe formed by communicating with the inner portion of the inner tube 12. A communicating hole 49 for interconnecting the piston lower chamber 47 with the reservoir chamber 48 is formed in the hollow pipe 33. Further, in the hollow pipe 33, as shown in FIG. 3, an orifice 50 is formed.

In accordance with the damper apparatus 32 structured in the manner described above, in a compressing step of the front fork 11, the oil 34 within the piston lower chamber 47 opens the check valve 44 and flows within the piston upper chamber 46, and the inner tube 13 is structured so that oil 34 in an amount corresponding to a volume entering into the outer tube 12 flows to the reservoir chamber 48 through the communicating hole 49. While oil 34 flows through the communicating hole 49, a damping force is generated on the compression side.

At a time of expanding the front fork 11, the oil 34 within the piston upper chamber 46 operates the check valve 44 to press the inclined surface portion 43 of the oil lock collar 42, flows within the reservoir chamber 48 through the orifice 50, or flows within the piston lower chamber 47 through a gap 51 between the inner peripheral surface of the check valve 44 and the outer peripheral surface of the hollow pipe 33. Further, at a time of expanding, the oil 34 flows within the piston lower chamber 47 from the reservoir chamber 48 through the communicating hole 49, so that a negative pressure of the piston lower chamber 47 is canceled. While oil 34 flows through the orifice 50 or the gap 51 between the check valve 44 and the hollow pipe 33, a damping force is generated at an expansion end. Due to the damping forces at the compression end and the expansion end mentioned above by means of the damper apparatus 32, the compressing and expanding motion of the front fork 11 is restricted.

In this case, reference numeral 52 shown in FIG. 3 denotes a stopper collar, reference numeral 53 denotes a rebound spring and reference numeral 54 denotes an oil lock valve. The stopper collar 52 stops the check valve 44 at a time of compressing the front fork 11. Further, at a time of greatest compression in the front fork 11, an oil lock oil chamber (not shown) is formed between the oil lock valve 54 and the oil lock piece 39. The oil lock valve 54 mentioned above is opened when the front fork 11 returns to the expanding phase, so as to introduce oil 34 to the oil lock oil chamber, positively canceling a negative pressure in the oil lock oil chamber. Further, reference numeral 55 shown in FIG. 1 denotes an oil seal and reference numeral 56 denotes a dust seal.

Figure 4:
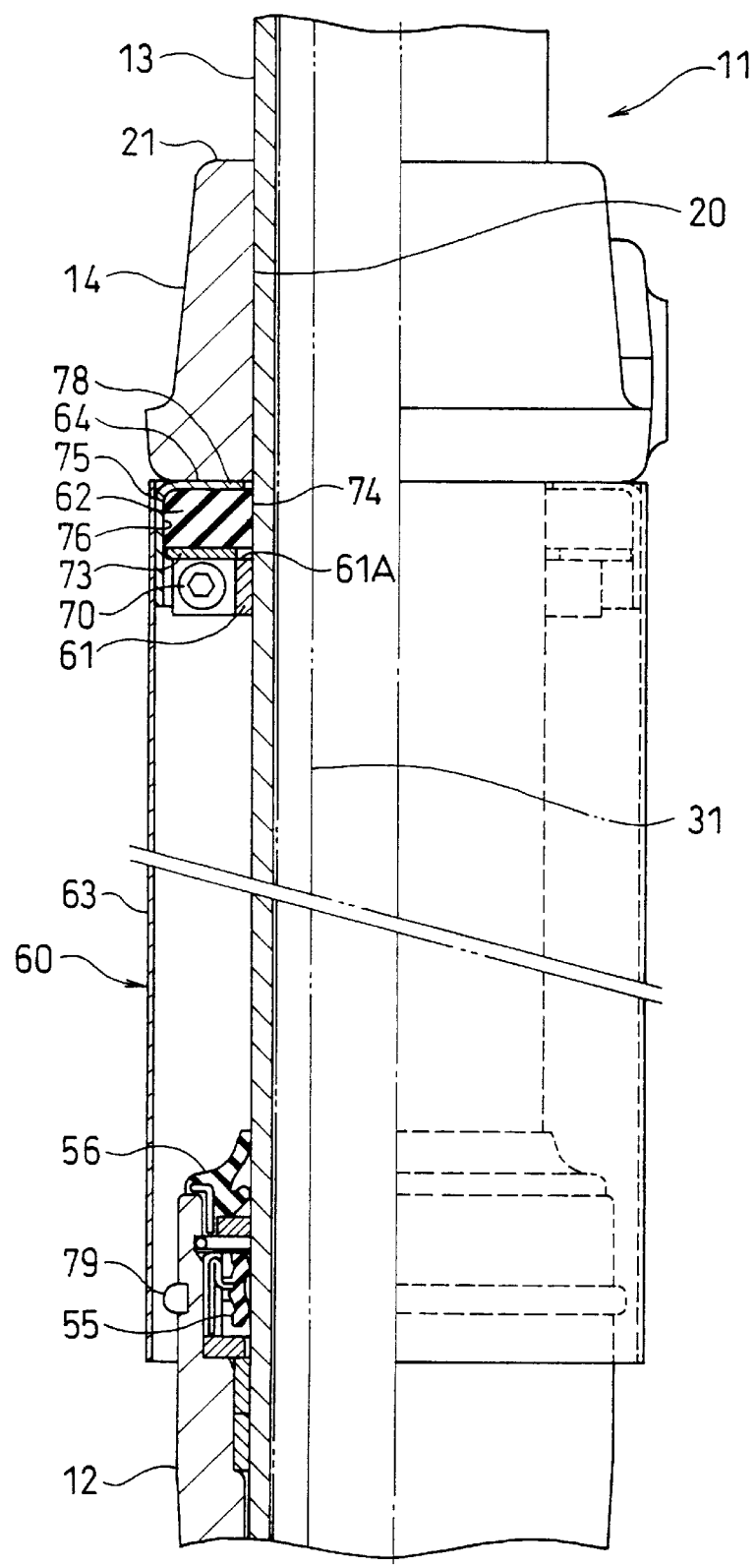
FIG. 4 is a half cross sectional view which shows a center portion of FIG. 1 in an enlarged manner.

In this case, as shown in FIGS. 1 and 4, a dust cover 60 for protecting the outer peripheral surface of the inner tube 13 from a dirt and a dust is mounted in the lower portion of the under bracket 14 supporting the inner tube 13 of the front fork 11 on the vehicle body side. The dust cover 60 is mounted to the front fork 11 through the stopper 61 as a supporting member, a cover sheet 62 as an elastic body and the under bracket 14.

Figure 5A:
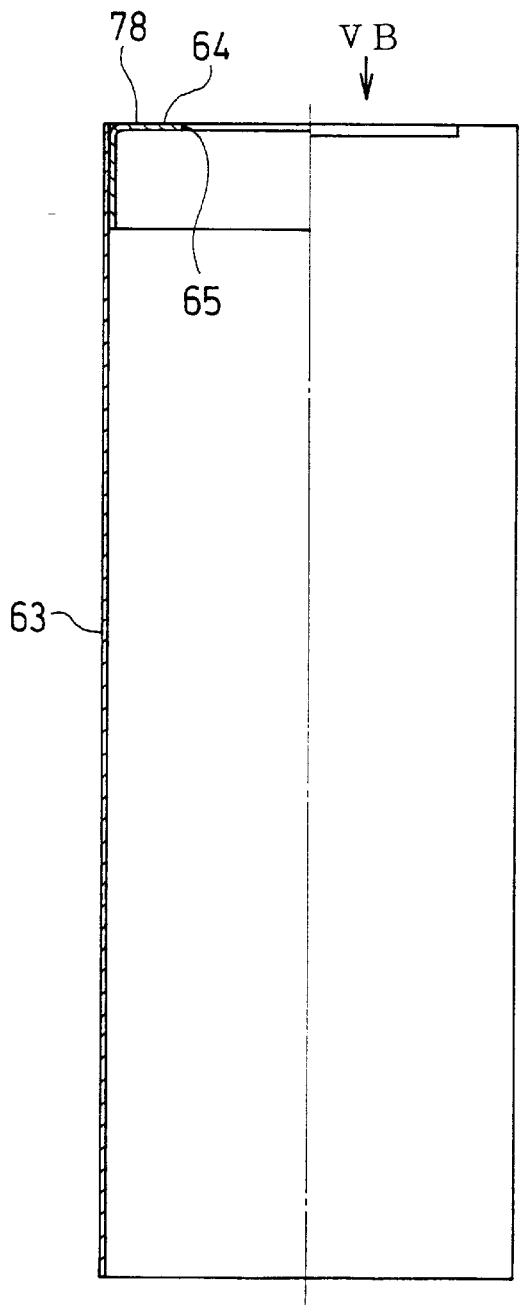
FIG. 5A is a side elevational view which shows a left half of a dust cover in FIG. 4 in a partially sectional manner.
Figure 5B:
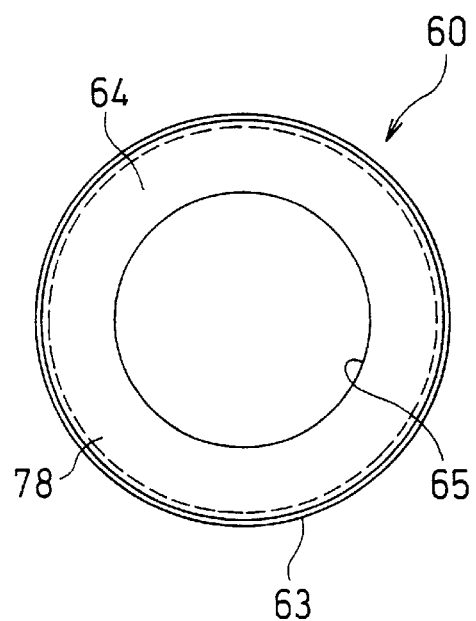
FIG. 5B is a schematic view as seen from an arrow VB in FIG. 5A.

The dust cover 60 is formed of steel or other suitable material, and as shown in FIGS. 5A and 5B, connects a flange 64 to an upper opening portion of a cover main body 63. An opening 65 inserting the inner tube 13 in a freely fitting state is formed on the flange 64, thereby being capable of forming the gap between the opening 65 and the inner tube 13. Further, an axial length of the cover main body 63 is set to a length at which the lower end portion of the cover main body 63 overlaps on the upper end portion of the outer tube 12 when the dust cover 60 is mounted in the lower portion of the under bracket 14.

Figure 6A:
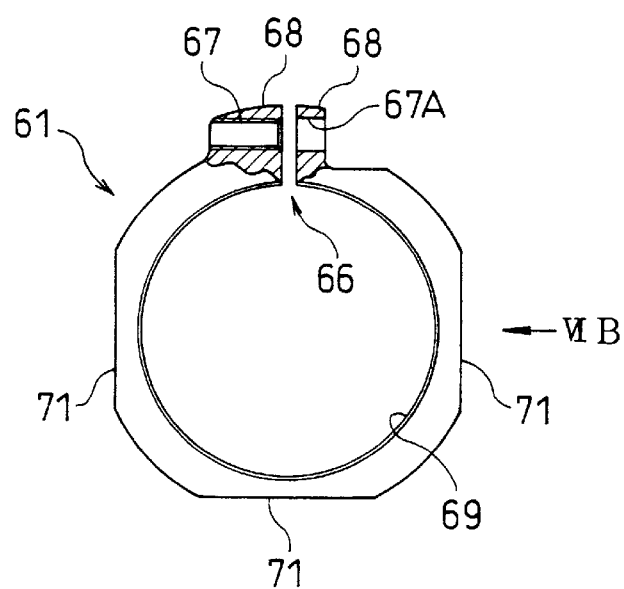
FIG. 6A is a front elevational view which shows a stopper in FIG. 4.
Figure 6B:
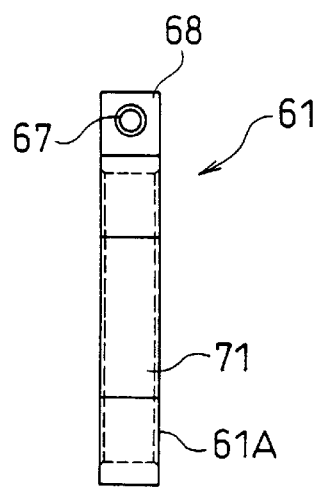
FIG. 6B is a schematic view as seen from an arrow VIB in FIG. 6A.

The stopper 61 mentioned above is formed in a substantially annular shape having a slot 66 in a diametrical direction, as shown in FIGS. 6A and 6B, and a cramp portion 68 having a female screw portion 67 and a cramp portion 68 having a bolt inserting hole 67A formed in both sides of the slot 66. The diameter of inner peripheral hole 69 of the stopper 61 is compressed by inserting the inner tube 13 of the front fork 11 to the inner peripheral hole 69 of the stopper 61 and engaging fastening bolt 70 (FIG. 4) with the female screw portion 67, so that the stopper 61 is fixed to the outer peripheral surface of the inner tube 13 of the front fork 11.

Further, at a plurality of portions on the outer peripheral surface of the stopper 61, cut portion 71 makes a stopper 61 thin, thereby securing a fastening force against the inner tube 13 of the stopper 61 by means of the fastening bolt 70.

Figure 7:
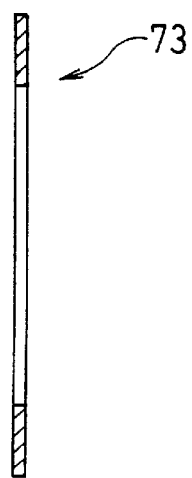
FIG. 7 is a cross sectional view which shows the washer in FIG. 4.

Still further, as shown in FIG. 4, an annular washer 73 (FIG. 7) having an opening larger than the supporting surface 61 is provided on a supporting surface 61A (a surface close to the under bracket 14) of the stopper 61 fixed to the inner tube 13, so that a pressure receiving area against the cover sheet 62 can be well secured.

Figure 8A:
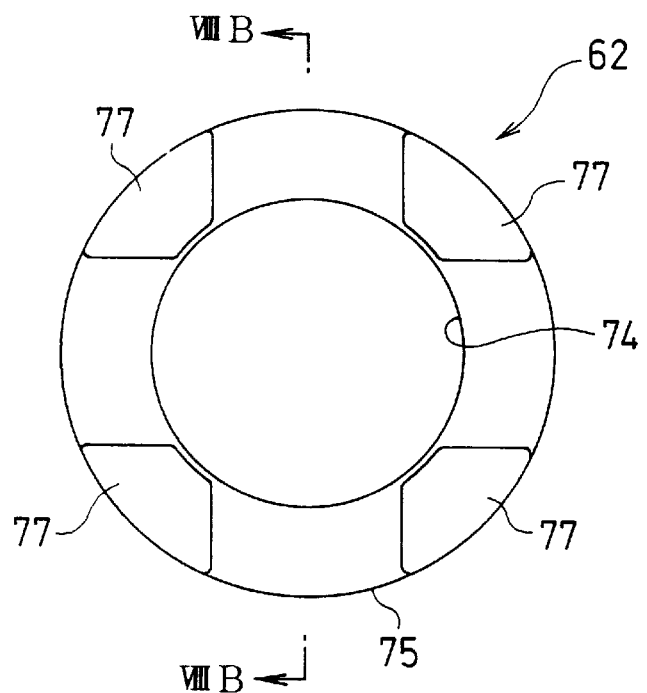
FIG. 8A is a front elevational view which shows the cover sheet in FIG. 4.
Figure 8B:
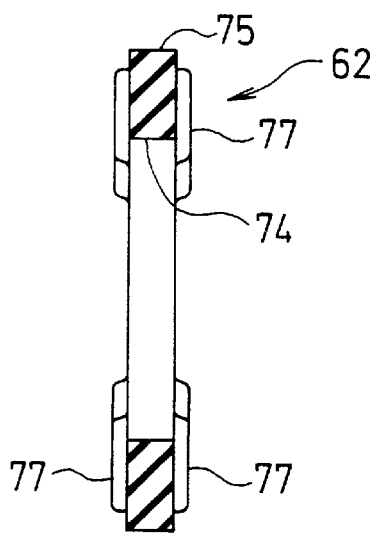
FIG. 8B is a cross sectional view along a line VIIIB—VIIIB in FIG. 8A.

The cover sheet 62 mentioned above is formed in an annular shape as shown in FIGS. 8A and 8B, and the inner tube 13 of the front fork 11 is inserted through an inner peripheral hole 74. Further, an outer peripheral surface 75 of the cover sheet 62 has a diameter substantially the same as the inner opening 76 of the flange 64 of the dust cover 60. Further, on both end surfaces (a front surface and a back surface) of the cover sheet 62, expanding portions 77 (FIGS. 8A and 8B) are formed at a plurality of portions in the peripheral direction. These expanding portions 77 are brought into contact with a washer 73 and a top surface portion 78 of the flange 64 of the dust cover 60 when mounting the dust cover 60.

Further, the cover sheet 62 is formed of rubber (for example, a hardness 50) or a synthetic resin, or other suitable material, and is constituted in such a manner as to separate from the washer 73 and the flange 64 of the dust cover 60.

Mounting the dust cover 60 mentioned above is performed by first fixing the stopper 61 to a predetermined position on the inner tube 13 in the front fork 11 by using the fastening bolt 70, as shown in FIG. 4. Next, the washer 73 is placed on the supporting surface 61A of the stopper 61 and the cover sheet 62 is placed on the washer 73. Thereafter, the flange 64 of the dust cover 60 is locked by the stopper 61 through the washer 73 and the cover sheet 62. In this state, the under bracket 14 is inserted from the upper end side of the inner tube 13, and the fastening bolt 29 is fastened to the female screw portion 28 of the cramp portion 27 of the under bracket 14 at a position at which an inserting length (that is, a distance between the upper surface of the under bracket 14 and the upper end of the inner tube 13) L (FIG. 1) of the under bracket 14 is secured, so that the under bracket 14 is fixed to the inner tube 13.

The dust cover 60 is structured such that the inner peripheral surface 76 of the flange 64 is elastically brought into contact with the outer peripheral surface 75 of the cover sheet 62 so as to be concentrically supported to the inner tube 13. The flange 64 is held and fixed between the under bracket 14 and the stopper 61 under a state of an axial compressing deformation of the cover sheet 62, in a state of fixing the under bracket 14 to the inner tube 13 as mentioned above.

Therefore, in accordance with the embodiment mentioned above, the following effects (1) to (5) can be obtained.

(1) Since the top surface portion 78 of the flange 64 of the dust cover 60 is held and fixed between the under bracket 14 and the stopper 61 under axial compressing deformation of the cover sheet 62, the dust cover 60 can be securely mounted to the inner tube 13 of the front fork 11 due to reaction force on the basis of the compressing deformation of the cover sheet 62. Accordingly, since it is not necessary to form the bolt inserting hole for inserting the mounting bolt in accordance with the conventional art in the under bracket 14, and the dust cover 60, as well as the structure of the under bracket 14, the dust cover 60 can be made simple, the dust cover 60 can be mounted at the same time when the under bracket 14 is mounted to the inner tube 13, so that the dust cover 60 can be easily mounted.

(2) The cover sheet 62 mentioned above is axially compressed and deformed between the under bracket 14 and the stopper 61, and as a result the diameter is expanded in the diametrical direction, so that the outer peripheral surface 75 thereof is elastically brought into contact with the inner peripheral surface 76 of the flange 64 in the dust cover 60, thereby supporting the dust cover 60 in a concentric state with respect to the inner tube 13. Accordingly, a slant phenomenon of the dust cover 60 where the axis of the dust cover 60 is inclined with respect to the axis of the inner tube 13 can be prevented. As a result, slidable contact of that the dust cover 60 with the outer peripheral surface of the outer tube 12 is prevented avoiding damage to the outer peripheral surface.

(3) Since the dust cover 60 is supported on the inner tube 13 through the cover sheet 62, vibration of the dust cover itself and vibration transmitted to the dust cover 60 from the inner tube 13 is absorbed by the cover sheet 62. Further, even when the dust cover 60 is made of metal in the same manner as the inner tube 13, the dust cover 60 and the inner tube 13 are not brought into contact with each other, so that vibrating sound of the dust cover 60 is prevented.

(4) Since the annular cover sheet 62 is compressed and deformed in the axial direction with respect to the stopper 61 when the under bracket 14 is inserted into the inner tube 13, even with a dimensional error in the axial direction between the under bracket 14 and the inner tube 13 at the time of inserting the under bracket 14, such error can be absorbed by the compressing deformation in the axial direction of the cover sheet 62 mentioned above. As a result, an inserting size of the under bracket 14 from the upper end of the inner tube 13 can always be well secured.

(5) Since the annular cover sheet 62 is supported by the washer 73 having a width larger than the supporting surface 61A of the annular stopper 61, the pressure receiving area of the annular cover sheet 62 can be set to be large. As a result, the cover sheet 62 generates a great reaction force in accordance with the compressing deformation in the axial direction, thereby securing the mounting of the dust cover 60.

In this case, reference numeral 79 shown in FIG. 4 denotes a C-ring made of a resin, which is structured so that even in case of emergency wherein the dust cover 60 generates a slant phenomenon with respect to the inner tube 13, the dust cover 60 is still brought into contact with the cover main body 62 of the dust cover 60, and the cover main body 62 is still brought into contact with the outer peripheral surface of the outer tube 12, thereby preventing damage on the outer peripheral surface.

[B] Second Embodiment

Figure 9:
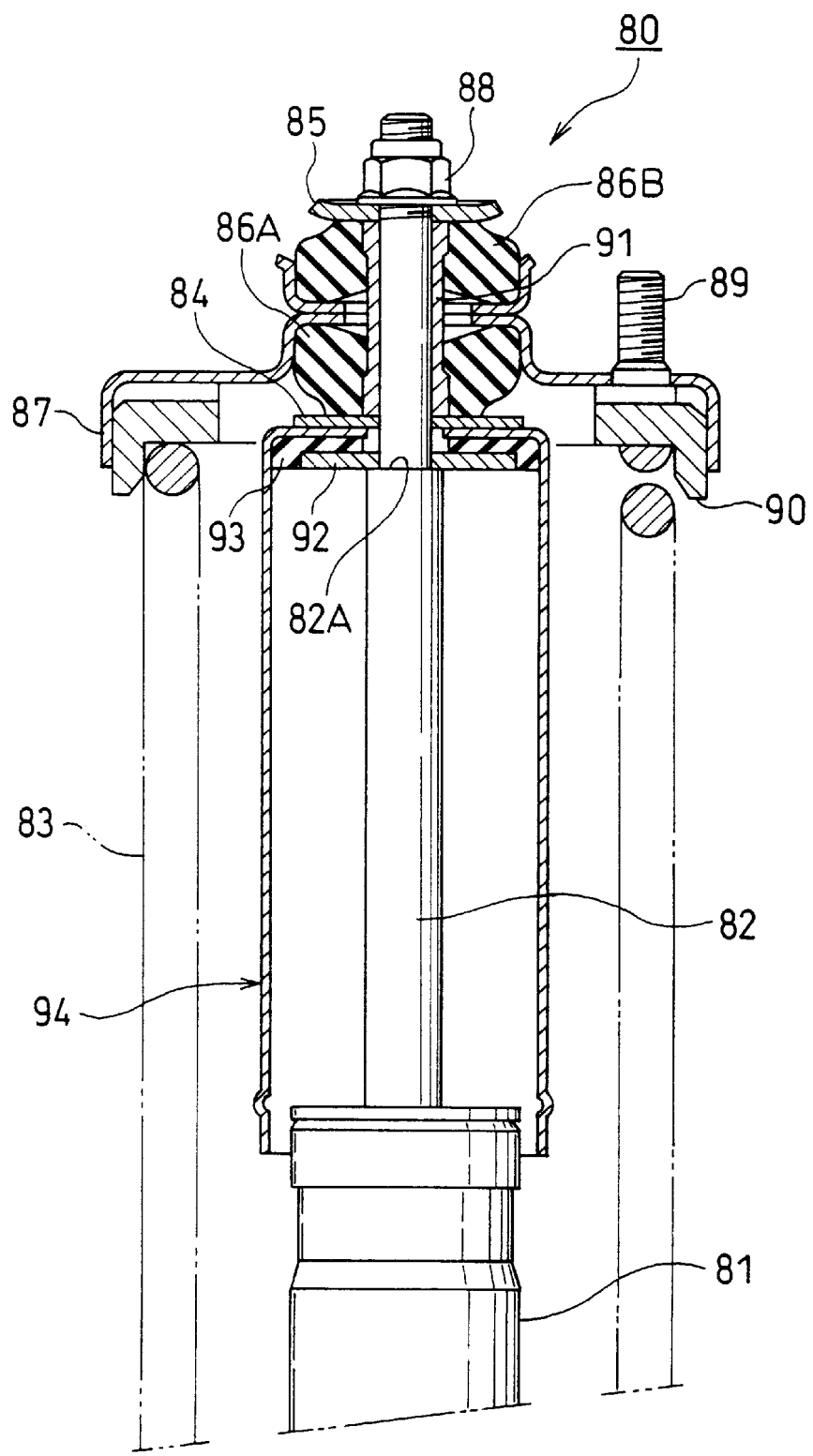
FIG. 9 is a partly side elevational view showing a hydraulic shock absorber to which a second embodiment of a dust cover mounting structure is applied, in a partially sectional manner.

As shown in FIG. 9, in a hydraulic shock absorber 80 for a vehicle used for an automotive vehicle and a motorcycle, as well as a working fluid is charged within a cylinder 81, a piston (not shown) is slidably arranged and a damping mechanism for generating a damping force is provided in the piston. An end of a piston rod 82 is connected to the piston, and the other end of the piston rod 82 is extended to an outer portion of the cylinder 81. A suspension spring 83 is interposed between the piston rod 82 and the cylinder 81, and the hydraulic shock absorber 80 is arranged between the vehicle side and an axle side. Impact from the road surface is absorbed by the suspension spring 83, and vibration of the vehicle body is damped by the damping mechanism of the hydraulic shock absorber 80.

The hydraulic shock absorber 80 is structured such that an axle bracket (not shown) is attached to a closed end portion of the cylinder 81, thereby supporting the axle through the axle bracket. Further, an upper end portion of the piston rod 82, that is, an end portion opposite to the cylinder 81 side is supported to a vehicle body (not shown) in a manner described below.

Accordingly, receiving seats 84 and 85 are positioned at an upper end portion of the piston rod 82 by a joint collar 91, and mounting rubbers 86A and 86B are disposed between the receiving seats 84 and 85. Here, the receiving seat 84 serves as a pressing member, and is positioned by a stopper 92, a cover seat 93 and a dust cover 94 as in a manner described below. In a state where a vehicle body mounting bracket 87 is held between the mount rubbers 86A and 86B, a mounting nut 88 engages an upper end portion of the piston rod 82, so that the upper end portion of the piston rod 82 is elastically mounted to the vehicle body mounting bracket 87. The vehicle body mounting bracket 87 is mounted to a vehicle body plate (not shown) in the vehicle body by using a mounting bolt 89 provided in the vehicle body mounting bracket 87, so that the upper end portion of the piston rod 82 in the hydraulic shock absorber 80 is elastically supported to the vehicle body through the mounting rubbers 86A and 86B and the vehicle body mounting bracket 87.

Further, a suspension spring 83 is interposed between a spring seat mount rubber 90 supported on the vehicle body mounting bracket 87 and a spring seat (not shown) attached to an outer periphery of the cylinder 81. The suspension spring 83 is held in such a manner that an initial spring load in a mounting state becomes constant.

Figure 10:
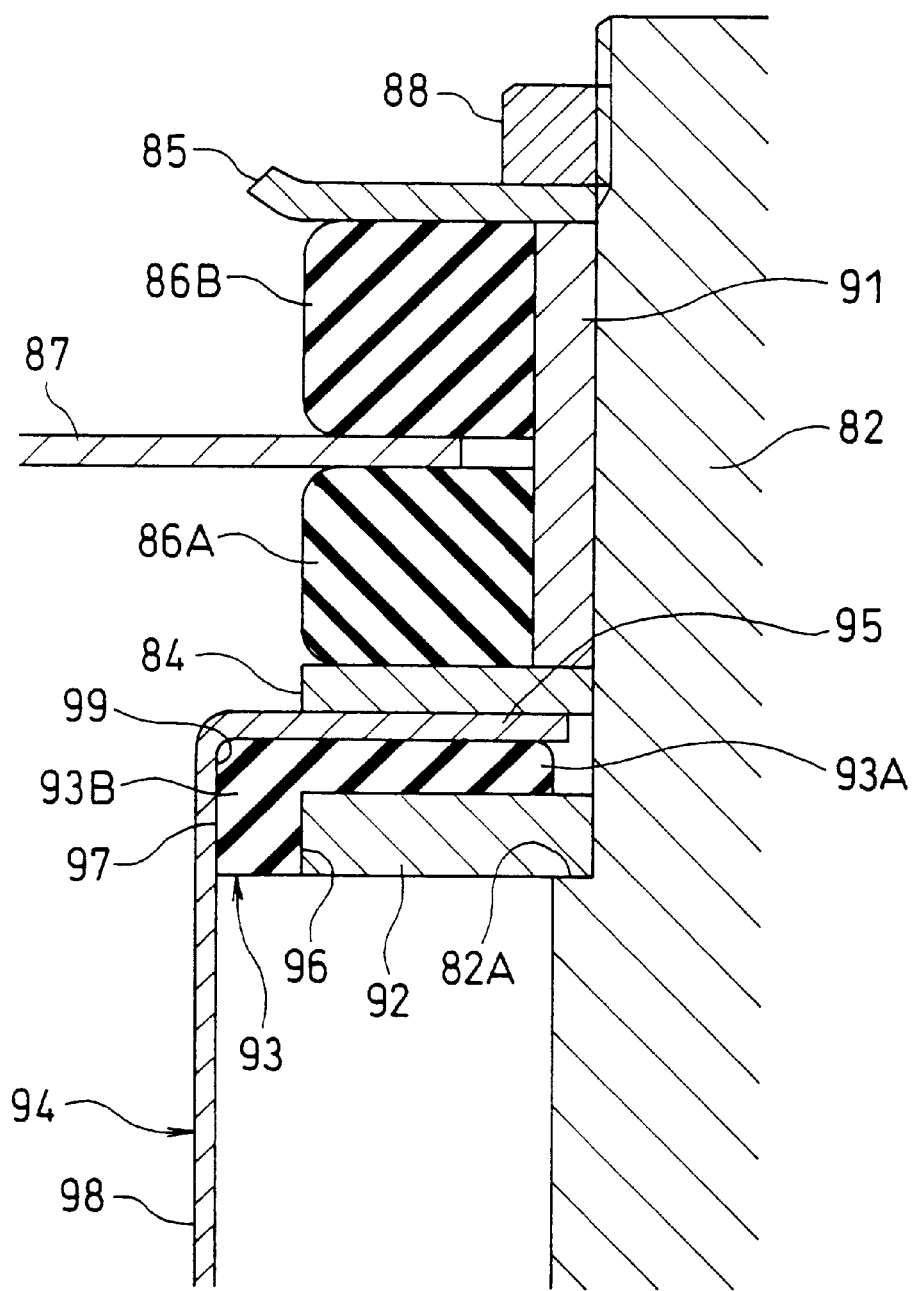
FIG. 10 is a cross sectional view which shows a part of FIG. 9 in an enlarged manner.

In this case, a step portion 82A is formed in the upper end portion of the piston rod 82, as shown in FIG. 10, and an annular stopper 92 as a supporting member is locked to the step portion 82A. An annular cover seat 93 as an elastic body is mounted to the stopper 92, and a flange 95 of a dust cover 94 is locked to the cover seat 93.

In this case, the cover seat 93 is formed in a cap shape, a top surface portion 93A is brought into contact with the stopper 92 and the flange 95 of the dust cover 94, an inner peripheral surface 96 of a side wall portion 93B is brought into contact with the stopper 92, and an outer peripheral surface 97 of a side wall portion 93B is brought into contact with an inner peripheral surface 99 of a cover main body 98 in the dust cover 94.

Also in accordance with this embodiment, the cover seat 93 is separated from the stopper 92 and the dust cover 94. Further, also in accordance with this embodiment, the flange 95 of the dust cover 94 has a gap with respect to the piston 82, and is fitted to the piston 82 in a loosely fitted state. The dust cover 94 is made of steel or other suitable material.

The receiving seat 84 moves to the stopper 92 side through the receiving seat 85 and the joint collar 91 by fastening the mounting nut 88, and the flange 95 of the dust cover 94 is held between the receiving seat 84 and the stopper 92 under a state of a compressing deformation in the axial direction of the cover seat 93. Due to the compressing deformation in the axial direction of the cover seat 93 mentioned above, the diameter of the cover seat 93 is expanded in the diametrical direction, the inner peripheral surface 99 of the cover main body 98 in the dust cover 94 is elastically brought into contact with the outer peripheral surface 97 of the cover seat 93, and the dust cover 94 is supported on the piston 82 in a concentric state.

Accordingly, also in accordance with the second embodiment, the following effects (1) to (4) the same as those of the first embodiment can be obtained.

(1) Since the flange 95 of the dust cover 94 is held and fixed between the receiving seat 84 and the stopper 92 under the axial compressing deformation of the cover seat 93, the dust cover 94 can be securely mounted to the piston rod 82 of the hydraulic shock absorber 80 due to an operation of a reaction force on the basis of the compressing deformation of the cover seat 93. Accordingly, since it is not necessary to form the bolt inserting hole for inserting the mounting bolt (in accordance with the prior art) in the receiving seat 84 and the dust cover 94, the structure of the receiving seat 84 and the dust cover 94 can be made simple, the dust cover 94 can be mounted at the same time when the mount rubbers 86A and 86B and the vehicle body mounting bracket 87 are mounted to the piston 82, so that the dust cover 94 can be easily installed.

(2) The cover seat 93 is axially compressed and deformed between the receiving seat 84 and the stopper 92, and as a result the diameter is expanded in the diametrical direction, so that the outer peripheral surface 97 thereof is elastically brought into contact with the inner peripheral surface 99 of the dust cover 94, thereby supporting the dust cover 94 in a concentric state with respect to the piston rod 82. Accordingly, a slant phenomenon of the dust cover 94 where the axis of the dust cover 94 is inclined with respect to the axis of the piston rod 84 is prevented. As a result, the dust cover 94 will not slidably contact the outer peripheral surface of the cylinder 81 in the hydraulic shock absorber 80, so as to rub the outer peripheral surface and cause damage.

(3) Since the dust cover 94 is supported on the piston rod 82 through the cover seat 93, vibration of the dust cover 94 itself and vibration transmitted to the dust cover 94 from the piston rod 82 is absorbed by the cover seat 93. Further, even when the dust cover 94 is made of a metal in the same manner as the piston rod 82, the dust cover 94 and the piston rod 82 have a gap therebetween and are not brought into contact with each other, so that vibrating sound or rattle of the dust cover 94 prevented.

(4) Since the supporting surface of the annular stopper 92 makes the pressure receiving area large with respect to the top surface portion 93A of the cover sheet 93, the cover sheet 92 generates a great reaction force in accordance with the compressing deformation in the axial direction, thereby securely supporting the dust cover 94.

[C] Third, Fourth and Fifth Embodiments

In the third, fourth and fifth embodiments, the same reference numerals will be used for the same elements as those of the first embodiment, and an explanation thereof will be omitted.

Figure 11:
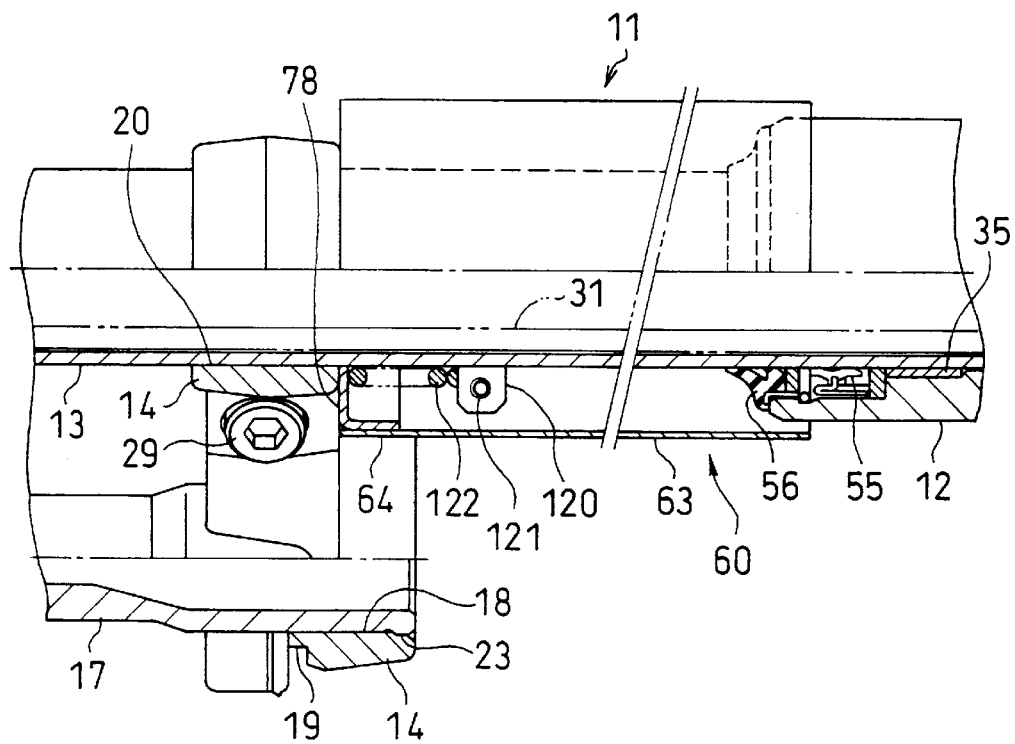
FIG. 11 is a side elevational view showing a front fork to which a third embodiment of a dust cover mounting structure is applied, in a partially sectional manner.

In the third embodiment shown in FIG. 11, the structure is made such that a substantially annular stopper 120 is fixed at a predetermined position of the inner tube 13 by a fastening bolt 121, and a balance spring 122 and a dust cover 60 are locked to the stopper 120. Then, the balance spring 122 is compressed and deformed when the under bracket 14 is inserted at a predetermined position of the inner tube 13, and the dust cover 60 is held and fixed between the stopper 120 and the under bracket 14 through the balance spring 122 in a state where the flange 64 thereof is compressed and deformed in an axial direction of the balance spring 122.

Figure 12:
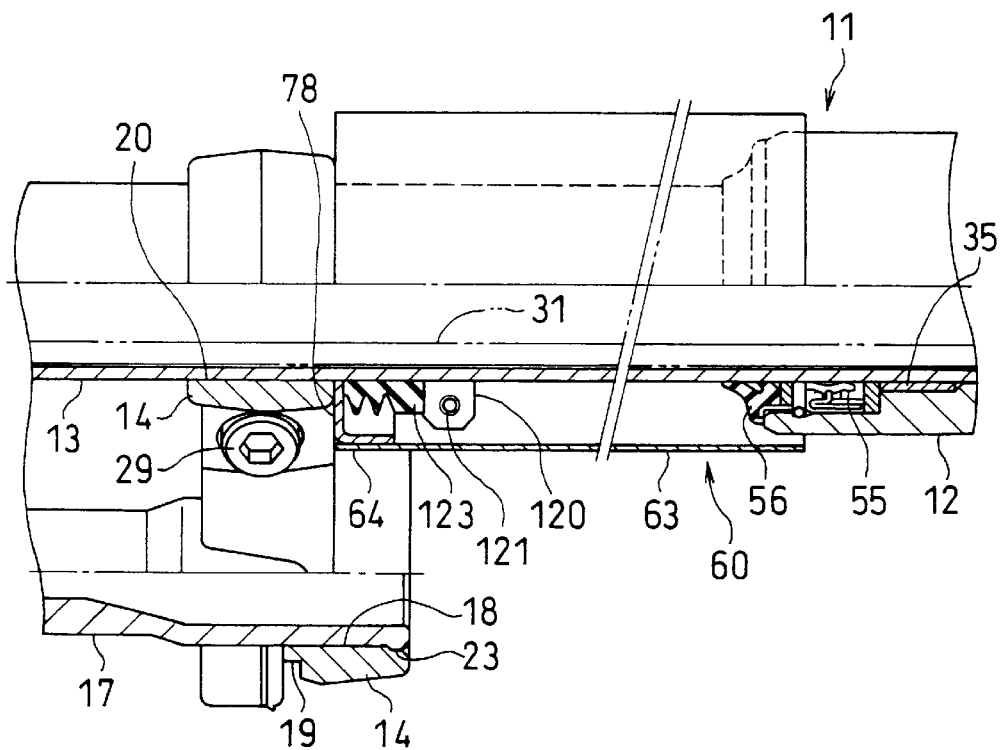
FIG. 12 is a side elevational view showing a front fork to which a fourth embodiment of a dust cover mounting structure is applied, in a partially sectional manner.

In the fourth embodiment shown in FIG. 12, the structure is made such that the balance spring 122 in accordance with the third embodiment is replaced by an elastic body 123 such as a cushion rubber or the like, and the dust cover 60 is held and fixed between the stopper 120 and the under bracket 14 through the elastic body 123 in a state where the flange 64 thereof is compressed and deformed in an axial direction of the elastic body 123.

Figure 13:
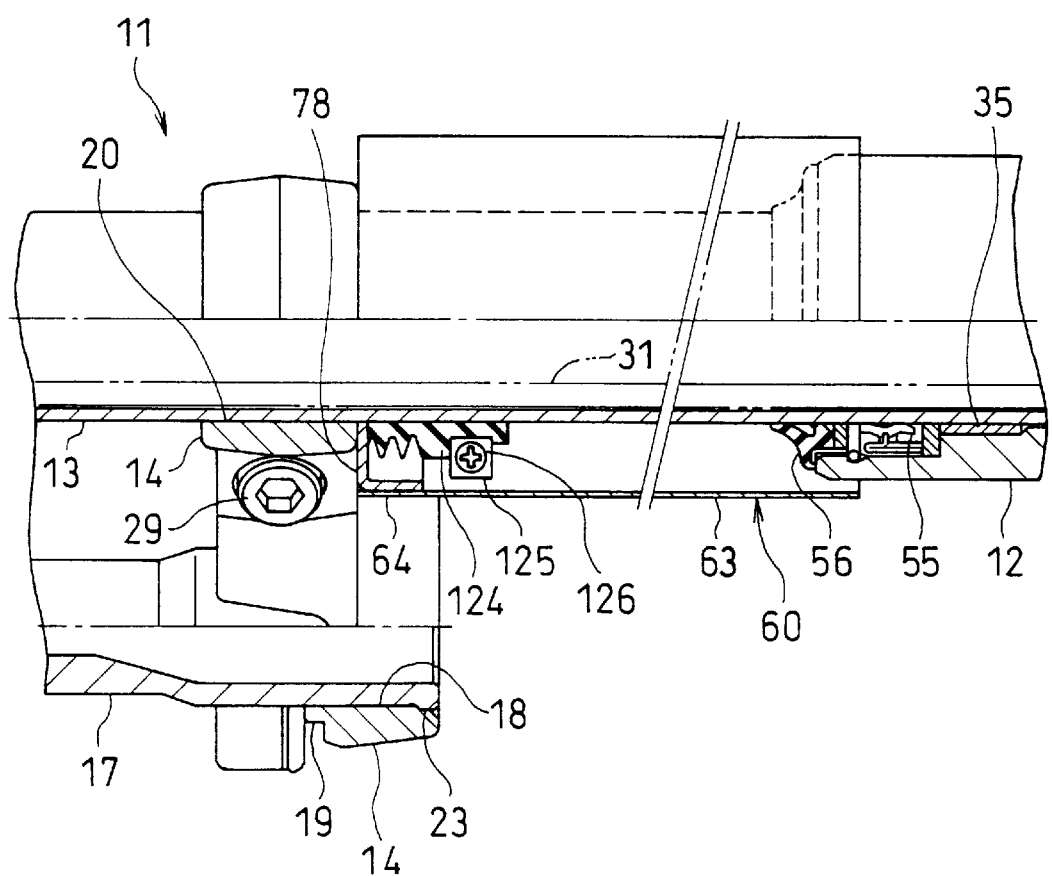
FIG. 13 is a side elevational view showing a front fork to which a fifth embodiment of a dust cover mounting structure is applied, in a partially sectional manner.
Figure 14:
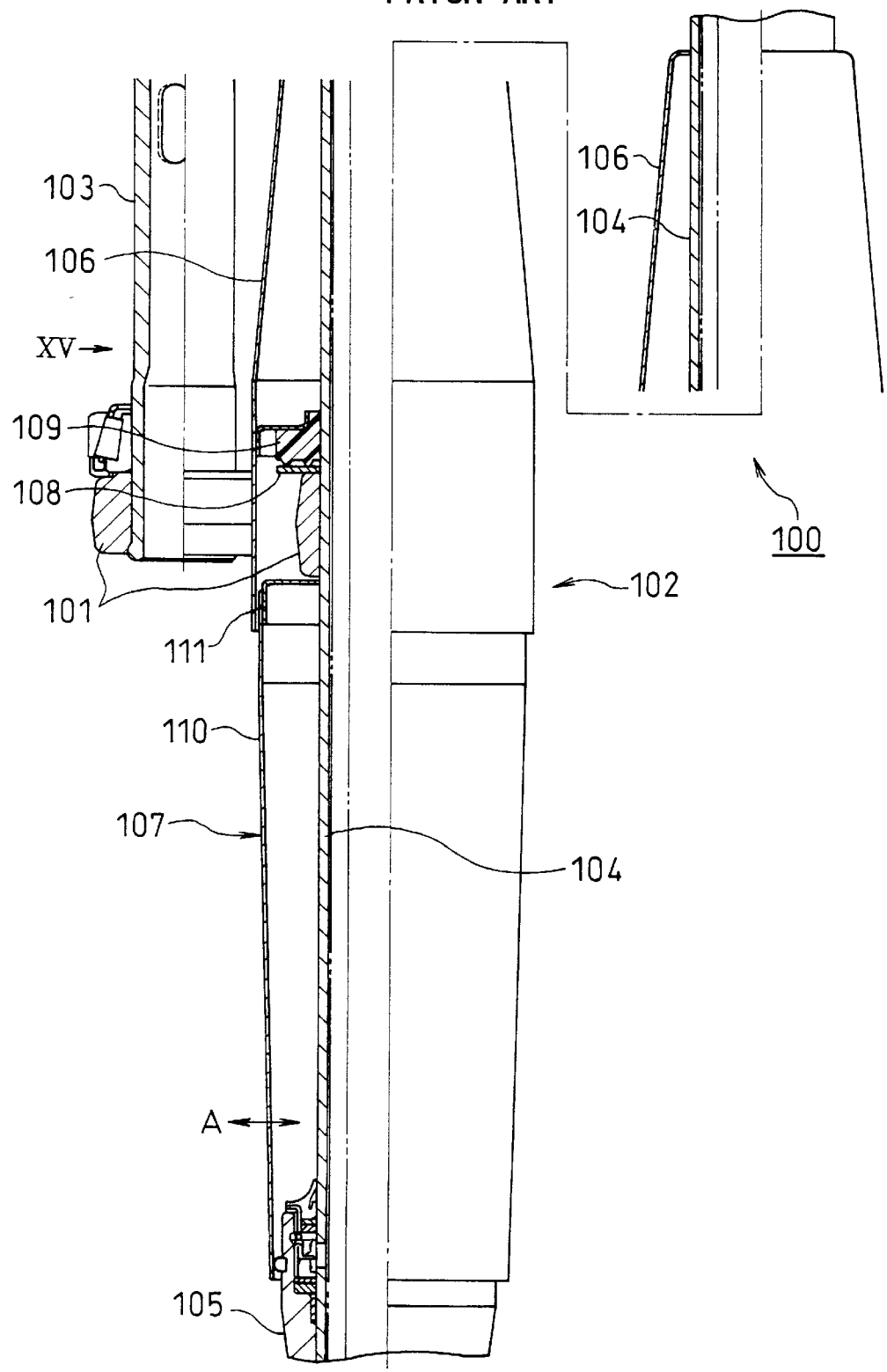
FIG. 14 is a side elevational view showing a prior art front fork assembly, in a partially sectional manner.
Figure 15:
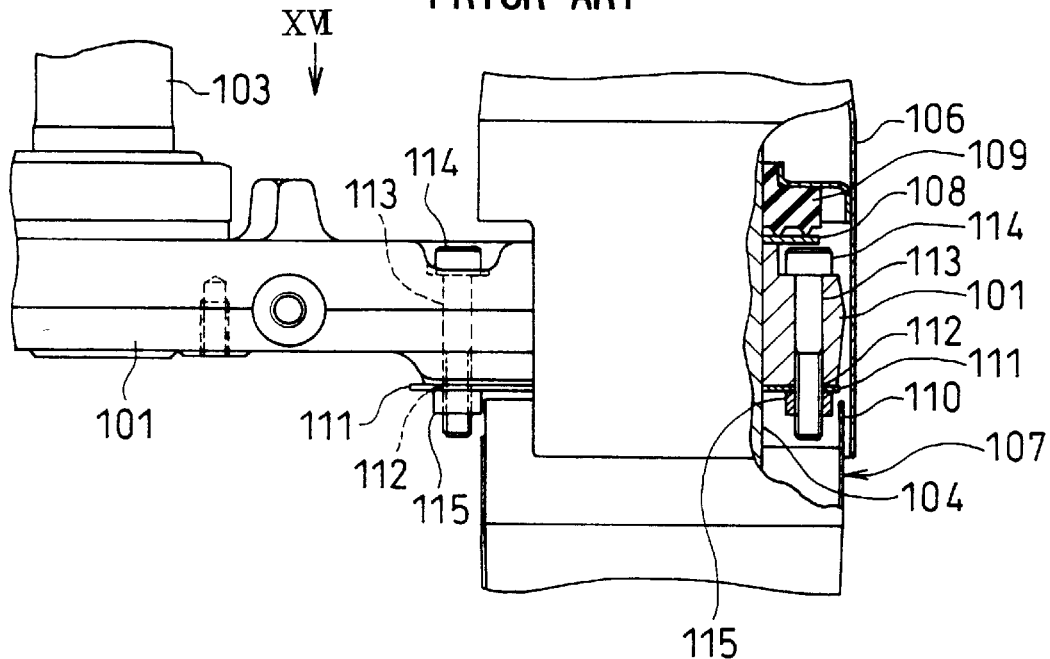
FIG. 15 is a schematic view as seen from an arrow XV in FIG. 14, in a partially sectional manner.
Figure 16:
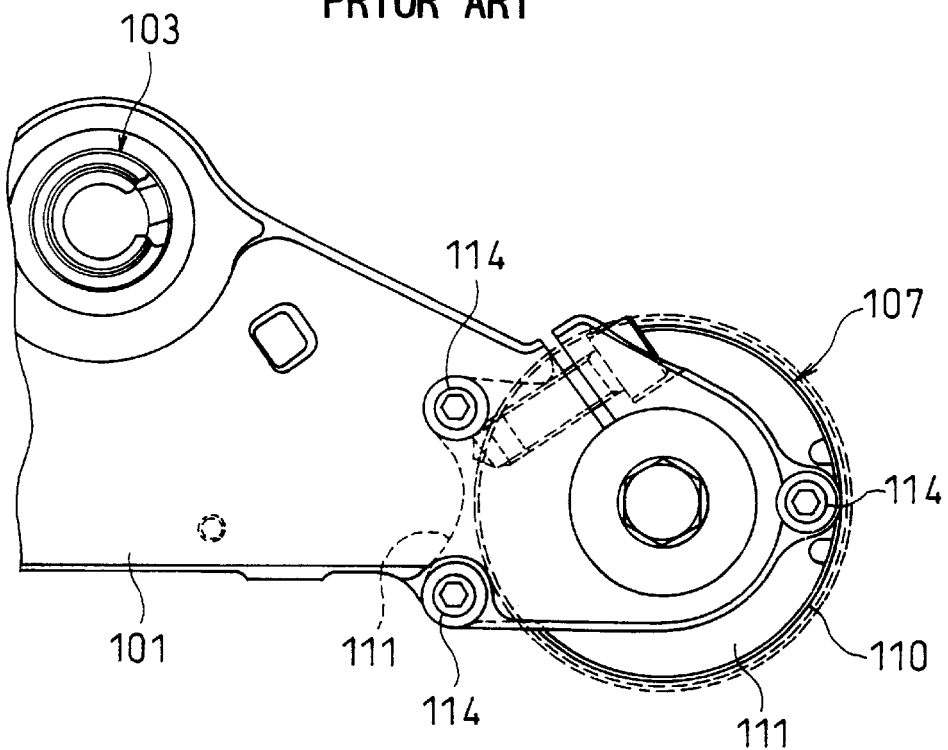
FIG. 16 is a schematic view as seen from an arrow XVI in FIG. 15.

In the fifth embodiment shown in FIG. 13, the structure is made such that an elastic body 124 such as a cushion rubber or the like is fixed to the inner tube 13 by using a band member 125 formed in a substantially annular shape and fastening the band member 125 by means of a screw 126 or the like, and the dust cover 60 is locked to the elastic body 124. Then, the elastic body 124 is compressed and deformed in the axial direction by inserting the under bracket 14 to a predetermined position of the inner tube 13, so that the flange 64 of the dust cover 60 is held and fixed between the under bracket 14 and the elastic body 124.

Also, in the third to fifth embodiments, since the flange 64 of the dust cover 60 is supported by a reaction force on the basis of an axial compressing deformation of the balance spring 122, or the elastic body 123 or 124, the dust cover 60 can be securely supported by a simple structure.

In the first to fifth embodiments mentioned above, the description is given in the case where the dust cover 60 or 94 is made of a metal such as a steel material or resin or the like.

Further, in the first, third, fourth and fifth embodiments, the description is given in the case where the dust cover 60 is the under dust cover, however, an upper dust cover may be provided in each of the embodiments mentioned above. Still further, in these embodiments, the description is given in the case of the normal stand type front fork, however, the present invention may be applied to an inverted stand type front fork in which an outer tube corresponds to a vehicle body side tube and an inner tube corresponds to a wheel side tube.

Furthermore, in the first embodiment, the description is given in the case that the cover seat 62 is separated from the washer 73, the stopper 61 and the dust cover 60, however, the cover seat 62 may be integrally formed with the washer 73 or stopper 61 by a plating or the like. Moreover, in the second embodiment, the description is given in the case where the cover seat 93 is separated from the stopper 92 and the dust cover 94, although, it may be integrally formed with the stopper 94 by a plating or the like.

While the preferred embodiments of the invention have been described in detail with reference to the drawings, they are by no means limitative, and various changes and modifications are possible without departing from the scope and spirit of the invention.

As mentioned above, in accordance with the dust mounting structure of the present invention, as well as the dust cover can be mounted by a simple structure, a slant phenomenon of the dust cover can be certainly prevented.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. A dust cover mounting structure for a front fork of a two-wheel vehicle wherein a vehicle body side tube is slidably inserted in a wheel side tube so as to constitute the front fork, a dust cover for protecting an insertion portion of said vehicle body side tube inserted in said wheel side tube, is mounted to a lower portion of a vehicle body side bracket for mounting said vehicle body side tube to the vehicle body, and extends along from around the outer periphery of the said vehicle body side tube to around the outer periphery of said wheel side tube, comprising an annular supporting stopper fixed to the outer peripheral surface of said vehicle body side tube, a flange portion of said dust cover locked to the supporting stopper through an annular elastic body, the flange portion being held and fixed between said vehicle body side bracket and said supporting member stopper under an axial compressing deformation of said elastic body, and an inner peripheral surface of said dust cover being elastically brought into contact with an outer peripheral surface of said elastic body and supported to said vehicle body side tube in a concentric state.

2. A dust cover mounting structure as recited in claim 1, wherein said annular elastic body is separated from the annular supporting member.

3. A dust cover mounting structure as recited in claim 1, wherein said annular elastic body is integrally formed with the annular supporting member.

4. A dust cover mounting structure as recited in claim 1, wherein a washer having an opening larger than the supporting surface of said supporting member is interposed between said supporting member and said annular elastic body.

5. A dust cover mounting structure as recited in claim 2, wherein a washer having an opening larger than the supporting surface of said supporting member is interposed between said supporting member and said annular elastic body.

6. A dust cover mounting structure as recited in claim 1, wherein said annular elastic body is formed of a rubber or a synthetic resin.

7. A dust cover mounting structure as recited in claim 2, wherein said annular elastic body is formed of a rubber or a synthetic resin.

8. A dust cover mounting structure as recited in claim 3, wherein said annular elastic body is formed of a rubber or a synthetic resin.

* * * * *